Nov. 5, 1957 F. C. HALLDEN 2,812,444

ELECTRON-MULTIPLIER AMPLIFIER

Filed Nov. 25, 1953

United States Patent Office 2,812,444

Patented Nov. 5, 1957

2,812,444

ELECTRON-MULTIPLIER AMPLIFIER

Frederick C. Hallden, Floral Park, N. Y., assignor to Hazeltine Research, Inc., Chicago, Ill., a corporation of Illinois

Application November 25, 1953, Serial No. 394,299

6 Claims. (Cl. 250—207)

*General*

Figure 1:
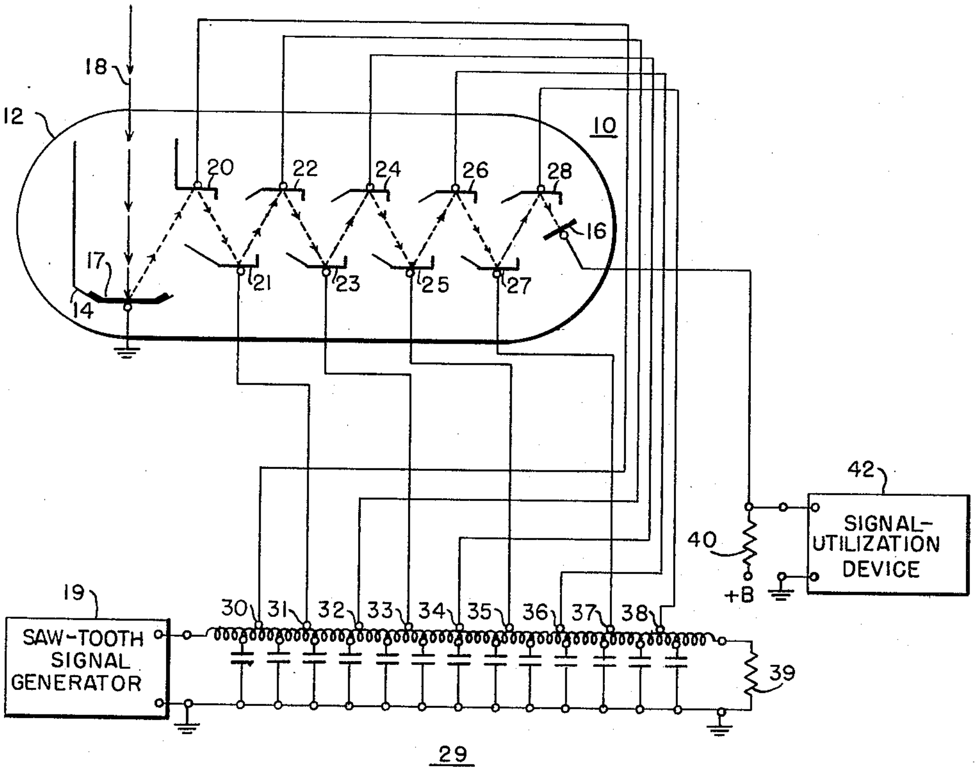

This invention relates to electron-multiplier amplifiers and, while it is of general application, it is particularly useful in Geiger and scintillation-type radiation counters, photometric measuring devices, and relay-type control systems.

Electron-multiplier amplifiers of a type heretofore proposed comprise photo-multiplier tubes having a plurality of secondary-emission electrodes to which are applied operating potentials increasing progressively from electrode to electrode in the direction from the cathode to the collector electrode. Since these tubes are commonly designed for operating potential differences of the order of 100 volts between adjacent secondary-emission electrodes, the over-all supply potential required may be relatively high, for example, of the order of 1000 volts. As a result, relatively expensive high-potential power-supply circuits are required.

Another type of electron-multiplier amplifier heretofore proposed comprises an electron-discharge device which utilizes a relatively low alternating signal to cause repetitive electron deflection between a single pair of secondary-emission electrodes thereof. The electron space charge in transit between the secondary-emission electrodes is periodically sampled and discharged to provide periodic output signals. A device of this type inherently becomes saturated after a few transversals between electrodes with the result that the magnitude of the output signal may not be representative of the intensity of the input signal. Such operation is objectionable for many applications. Furthermore, devices of this type are not at this time commercially available.

It is an object of the invention, therefore, to provide a new and improved electron-multiplier amplifier which avoids one or more of the foregoing disadvantages and limitations of electron-multiplier amplifiers heretofore proposed.

It is another object of the invention to provide a new and improved electron-multiplier amplifier utilizing a commercially available electron-multiplier tube and a relatively inexpensive low-potential power-supply circuit.

It is a further object of the invention to provide a new and improved electron multiplier amplifier of relatively simple construction and capable of developing an output signal having an amplitude representative of the intensity of the input signal.

In accordance with the invention, an electron-multiplier amplifier comprises a repetitive potential-supply circuit and a secondary-emission electron-discharge device having a signal-controlled cathode, a collector electrode, and a plurality of secondary-emission electrodes progressively spaced between the cathode and collector electrode. The amplifier further includes a time-delay network having parameters providing a time delay and coupled to the supply circuit and having a plurality of progressively spaced output terminals individually coupled to the secondary-emission electrodes for supplying thereto time-spaced potentials to cause an effective electric-field progression along successive secondary-emission electrodes synchronous with the secondary electron progression, the network parameters being proportioned to provide a time delay between successive output terminals approximately equal to the electron transit time between successive secondary-emission electrodes. In addition, the amplifier includes a signal-output circuit coupled to the collector electrode.

For a better understanding of the present invention, together with other and further objects thereof, reference is had to the following description taken in connection with the accompanying drawing, and its scope will be pointed out in the appended claims.

Figure 2:
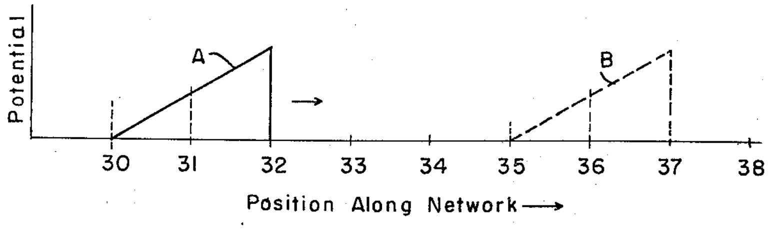

Referring to the drawing:

Fig. 1 is a circuit diagram, partly schematic, of an electron-multiplier amplifier constructed in accordance with the present invention, and Fig. 2 is a space-potential distribution graph used in explaining the operation of the Fig. 1 embodiment.

*Description of Fig. 1 electron-multiplier amplifier*

Referring now to Fig. 1 of the drawing, there is represented an electron-multiplier amplifier 10 constructed in accordance with the present invention and comprising a secondary-emission electron-discharge device having a signal-controlled cathode, a collector electrode, and a plurality of secondary-emission electrodes progressively spaced between the cathode and collector electrode. The term "signal-controlled cathode" is intended to denote a virtual cathode as well as an actual cathode. The secondary-emission electron-discharge device may be, for example, a photo-multiplier tube 12 having a signal-controlled photoemissive cathode 14, a collector electrode 16, and a plurality of secondary-emission electrodes 20–28, inclusive, progressively spaced between the cathode 14 and collector electrode 16. The cathode 14 includes a photosensitive layer 17 which, in response to light or other electromagnetic radiation 18 incident thereon, emits electrons at a rate representing the intensity of the incident radiation.

The amplifier also includes a circuit for supplying a repetitive potential of predetermined amplitude which controls the transit time of secondary-emission electrons between successive secondary-emission electrodes. The repetitive potential-supply circuit may be, for example, a periodic saw-tooth signal generator 19 for supplying saw-tooth potentials preferably having an amplitude approximately twice the desired operating potential difference between successive secondary-emission electrodes, a duration approximately twice the transit time therebetween, and a time separation between the termination of one potential and the initiation of the next not appreciably less than twice the transit time. The generator 19 is coupled to the photo-multiplier tube 12 in a manner presently to be explained.

The amplifier further includes circuit means coupled to the supply circuit and the secondary-emission electrodes for individually supplying thereto time-spaced potentials to cause an effective electric-field progression along successive secondary-emission electrodes synchronous with the secondary electron progression. It will be understood that "effective electric-field progression" denotes an effective progression of an electric-field point of maximum positive intensity along successive secondary-emission electrodes. The circuit means preferably comprises a time-delay network 29 coupled to the saw-tooth signal generator 19 and having a plurality of progressively and uniformly spaced output terminals 30–38, inclusive, individually coupled to the secondary-emission electrodes for supplying thereto successive time-spaced saw-tooth potentials of duration not appreciably less than the transit time of electrons between successive secondary-emission electrodes and having a time separation between the termination of one potential and the initiation of the next not appreciably less than twice this transit time. The time-delay network 29 preferably has such a time-delay characteristic that the delay between successive output terminals is approximately equal to the electron transit time between successive secondary-emission electrodes. The transit time between the cathode 14 and the first secondary-emission electrode 20 preferably is approximately equal to the transit time between successive secondary-emission electrodes. The time-delay network 29 may, for example, be an artificial transmission-line network terminated in a load resistor 39 that matches the characteristic impedance thereof to minimize end-energy reflections.

The amplifier 10 additionally includes a signal-output circuit comprising, for example, load resistor 40 coupled to the collector electrode 16 for deriving therefrom an output signal representative of the intensity of an electromagnetic radiation signal 18 incident on the photoemissive cathode 14. The load resistor 40 is coupled to a source of potential +B for maintaining the collector electrode 16 at a preferred positive potential level with respect to the other electrodes. The load resistor 40 is also coupled to a signal-utilization device 42 which may be, for example, a meter for reading average signal values and thereby giving an indication of the intensity of electromagnetic radiation incident on the cathode 14.

*Operation of Fig. 1 electron-multiplier amplifier*

Considering now the operation of the electron-multiplier amplifier just described, an electromagnetic radiation signal 18 incident on the photosensitive layer 17 of the cathode 14 causes the photosensitive layer 17 to emit electrons at a rate representing the intensity of the radiation signal. Assuming for the moment that the incident radiation signal is of a continuous nature, then electrons are continuously emitted from the photosensitive layer 17.

In the intervals between applications of saw-tooth potentials to the time-delay network 29 by the generator 19, the cathode-emitted electrons drift toward the collector electrode 16 because the collector electrode 16 is at a potential level +B which is positive with respect to the cathode 14. The saw-tooth potential supplied by the signal generator 19 to the input circuit of the time-delay network 29 may have, for example, a peak amplitude of 200 volts and a duration corresponding to twice the electron transit time between successive secondary-emission electrodes. As the leading edge of this saw-tooth potential reaches the first output terminal 30 of the network 29, the potential level of the first secondary-emission electrode 20 coupled thereto increases to a positive value of 200 volts with respect to the cathode 14. This causes an acceleration of the electrons recently emitted by the photosensitive layer 17 toward the electrode 20. These electrons strike the secondary-emission electrode 20 and are multiplied accordingly because of secondary electron emission from the electrode 20.

Because the time delay between the first and second output terminals 30 and 31 of the network 29 preferably is approximately equal to the electron transit time between the cathode 14 and the first secondary-emission electrode 20, the leading edge of the saw-tooth potential progresses to the output terminal 31 by the time the cathode-emitted electrons strike the secondary-emission electrode 20. Thus, the potential level of the secondary-emission electrode 21 rises to 200 volts with respect to the cathode while the potential level at the electrode 20 decreases to the mean value of the saw-tooth potential, namely, 100 volts with respect to the cathode. Under these conditions, there exists a potential difference of 100 volts between electrodes 21 and 20 and, hence, a corresponding positive electric field. The electrons leaving the electrode 20 are thus attracted toward the electrode 21.

Similarly, by the time this group of electrons reaches and produces electron multiplication at the electrode 21, the leading edge of the saw-tooth potential reaches the output terminal 32 so that a 100-volt difference in potential and, hence, a positive electric field exists between electrodes 22 and 21, thus attracting the multiplied electrons toward electrode 22. At this time, the space-potential distribution of the saw-tooth potential along the time-delay network 29, represented by curve A of Fig. 2, causes the potential level of the secondary-emission electrode 20 to be zero. No potential difference then exists between cathode 14 and electrode 20 so that no further electrons are accelerated toward the electrode 20 until the occurrence of the next saw-tooth potential.

From the time the leading edge of the saw-tooth potential passes an output terminal of the time-delay network 29, for example terminal 32, until the time the trailing portion of the saw-tooth potential passes the preceding terminal 31, the difference of potential between the corresponding secondary-emission electrodes 22 and 21 remains constant and thus maintains a constant-intensity electric field between the electrodes during this time interval. Since the constant-intensity electric field between any pair of successive electrodes occurs periodically, the secondary-emission electrons progress in distinct groups or bunches. As a saw-tooth potential progresses down the time-delay network 29, causing corresponding progression of a constant-intensity electric field along the electrodes 20–28, inclusive, an electron bunch progresses in synchronism therewith and electron multiplication occurs due to secondary emission at each electrode. Dotted-line curve B of Fig. 2 represents a later position of the saw-tooth potential represented by curve A along the network 29. Eventually, each electron bunch reaches the collector electrode 16 and produces an output signal across the load resistor 40. This signal is, in turn, supplied to the signal-utilization device 42, an average-current reading meter, which gives an indication representative of the intensity of the input radiation signal 18. Since the intervals between applications of saw-tooth potentials are preferably of duration not appreciably less than twice the transit time of electrons between successive secondary-emission electrodes, the electron progression between electrodes just explained is substantially unaffected by the later application of a second saw-tooth potential to the network 29.

For simplicity of explanation, it was initially assumed that the incident radiation signal 18 is of a continuous nature. It will also be understood that where the incident radiation occurs in discrete bursts, the amplifier 10 serves in a similar manner repetitively to sample and furnish an indication of the average intensity thereof.

The operation of an embodiment of the invention has been described in connection with a supplied saw-tooth potential. However, satisfactory operation may be obtained using signals or other wave forms. For example, a pulse of rectangular wave form having a duration approximately equal to the electron transit time between successive secondary-emission electrodes would provide satisfactory operation.

From the foregoing description of the invention, it will be apparent that the electron-multiplier amplifier 10 constructed in accordance with the present invention has the advantage of being capable of utilizing a commercially available photo-multiplier tube and a relatively low potential-supply circuit.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An electron-multiplier amplifier comprising: a photomultiplier tube having a signal-controlled photo-emissive cathode, a collector electrode, and a plurality of secondary-emission electrodes progressively spaced between said cathode and collector electrode; a circuit for supplying a periodic saw-tooth potential of predetermined amplitude which controls the transit time of secondary electrons between successive secondary-emission electrodes; a time-delay network having parameters providing a time delay and coupled to said supply circuit and having a plurality of progressively and uniformly spaced output terminals individually coupled to said secondary-emission electrodes for supplying thereto time-spaced saw-tooth potentials of duration not appreciably less than the transit time of electrons between successive secondary-emission electrodes to cause an effective progression of a constant-intensity electric field along successive secondary-emission electrodes synchronous with the secondary electron progression, said network parameters being proportional to provide a time delay between successive output terminals approximately equal to the electron transit time between successive secondary-emission electrodes; and a signal-output circuit coupled to said collector electrode for deriving therefrom an output signal representative of the intensity of an electromagnetic radiation signal incident on said photoemissive cathode.

2. An electron-multiplier amplifier comprising: a repetitive potential-supply circuit; a secondary-emission electron-discharge device having a signal-controlled cathode, a collector electrode, and a plurality of secondary-emission electrodes progressive spaced between said cathode and collector electrode; a time-delay network having parameters providing a time delay and coupled to said supply circuit and having a plurality of progressively spaced output terminals individually coupled to said secondary-emission electrodes for supplying thereto time-spaced potentials to cause an effective electric-field progression along successive secondary-emission electrodes synchronous with the secondary electron progression, said network parameters being proportioned to provide a time delay between successive output terminals approximately equal to the electron transit time between successive secondary-emission electrodes; and a signal-output circuit coupled to said collector electrode.

3. An electron-multiplier amplifier comprising: a repetitive saw-tooth potential-supply circuit; a secondary-emission electron-discharge device having a signal-controlled cathode, a collector electrode, and a plurality of secondary-emission electrodes progressively spaced between said cathode and collector electrode; a time-delay network having parameters providing a time delay and coupled to said supply circuit and having a plurality of progressively spaced output terminals individually coupled to said secondary-emission electrodes for supplying thereto successive time-spaced saw-tooth potentials of duration not appreciably less than the transit time of electrons between successive secondary-emission electrodes and separated by time intervals not appreciably less than twice said transit time to cause an effective progression of a constant-intensity electric field along successive secondary-emission electrodes synchronous with the secondary electron progression, said network parameters being proportioned to provide a time delay between successive output terminals approximately equal to the electron transit time between successive secondary-emission electrodes; and a signal-output circuit coupled to said collector electrode.

4. An electron-multiplier amplifier comprising: a repetitive saw-tooth potential-supply circuit; a secondary-emission electron-discharge device having a signal-controlled cathode, a collector electrode, and a plurality of secondary-emission electrodes progressively spaced between said cathode and collector electrode; a time-delay network having parameters providing a time delay and coupled to said supply circuit and having a plurality of progressively spaced output terminals individually coupled to secondary-emission electrodes for supplying thereto time-spaced saw-tooth potentials having an amplitude approximately twice the desired operating potential difference between successive secondary-emission electrodes to provide a predetermined transit time therebetween and having a duration approximately twice said transit time to cause an effective progression of a constant-intensity electric field along successive secondary-emission electrodes synchronous with the secondary electron progression, said network parameters being proportioned to provide a time delay between successive output terminals approximately equal to the electron transit time between successive secondary-emission electrodes; and a signal-output circuit coupled to said collector electrode.

5. An electron-multiplier amplifier comprising: a repetitive potential-supply circuit; a photo-multiplier tube having a signal-controlled photoemissive cathode subject to electromagnetic radiation, a collector electrode, and a plurality of secondary-emission electrodes progressively spaced between said cathode and collector electrode; a time-delay network having parameters providing a time delay and coupled to said supply circuit and having a plurality of progressively spaced output terminals individually coupled to said secondary-emission electrodes for supplying thereto time-spaced potentials to cause an effective electric-field progression along successive secondary-emission electrodes synchronous with the secondary electron progression, said network parameters being proportioned to provide a time delay between successive output terminals approximately equal to the electron transit time between successive secondary-emission electrodes; and a signal-output circuit coupled to said collector electrode for deriving therefrom an output signal representative of the intensity of an electromagnetic radiation signal incident on said photoemissive cathode.

6. An electron-multiplier amplifier comprising: a repetitive potential-supply circuit; a secondary-emission electron-discharge device having a signal-controlled cathode, a collector electrode, and a plurality of secondary-emission electrodes progressively spaced between said cathode and collector electrode; a time-delay network having parameters providing a time delay and coupled to said supply circuit and having a plurality of progressively and uniformly spaced output terminals individually coupled to said secondary-emission electrodes for supplying thereto time-spaced potentials to cause an effective electric-field progression along successive secondary-emission electrodes synchronous with the secondary electron progression, said network parameters being proportioned to provide a time delay between successive output terminals approximately equal to the electron transit time between successive secondary-emission electrodes; and a signal-output circuit coupled to said collector electrode.

References Cited in the file of this patent

UNITED STATES PATENTS

| | | |
|---|---|---|
| 2,430,265 | Weisglass | Nov. 4, 1947 |
| 2,553,565 | Ferguson | May 22, 1951 |
| 2,589,130 | Potter | Mar. 11, 1952 |